US011078377B2

(12) United States Patent
Gourdin et al.

(10) Patent No.: US 11,078,377 B2
(45) Date of Patent: Aug. 3, 2021

(54) ACTINIC RADIATION CURED POLYURETHANE COATING FOR DECORATIVE SURFACE COVERINGS

(71) Applicant: Tarkett GDL S.A., Lentzweiler (LU)

(72) Inventors: Diego Gourdin, Wiltz (LU); Dominique Robert, Wiltz (LU); Richard Peres, Bastogne (BE); Jean-Yves Simon, Wiltz (LU)

(73) Assignee: Tarkett GDL S.A., Lentzweiler (LU)

( * ) Notice: Subject to any disclaimer, the term of this patent is extended or adjusted under 35 U.S.C. 154(b) by 42 days.

(21) Appl. No.: 15/304,916

(22) PCT Filed: Apr. 9, 2015

(86) PCT No.: PCT/EP2015/057700
§ 371 (c)(1),
(2) Date: Oct. 18, 2016

(87) PCT Pub. No.: WO2015/158596
PCT Pub. Date: Oct. 22, 2015

(65) Prior Publication Data
US 2017/0174935 A1  Jun. 22, 2017

(30) Foreign Application Priority Data
Apr. 18, 2014 (EP) .................... 14165309

(51) Int. Cl.
C09D 175/16      (2006.01)
B32B 27/30       (2006.01)
B32B 3/30        (2006.01)
B32B 27/40       (2006.01)
B32B 7/12        (2006.01)
B32B 27/22       (2006.01)
B32B 27/08       (2006.01)
B32B 27/16       (2006.01)
B05D 3/06        (2006.01)
C09D 127/06      (2006.01)
E04F 13/18       (2006.01)
E04F 15/10       (2006.01)

(52) U.S. Cl.
CPC ............ C09D 175/16 (2013.01); B05D 3/06 (2013.01); B32B 3/30 (2013.01); B32B 7/12 (2013.01); B32B 27/08 (2013.01); B32B 27/16 (2013.01); B32B 27/22 (2013.01); B32B 27/304 (2013.01); B32B 27/308 (2013.01); B32B 27/40 (2013.01); C09D 127/06 (2013.01); E04F 13/18 (2013.01); E04F 15/105 (2013.01); B32B 2255/10 (2013.01); B32B 2255/26 (2013.01); B32B 2307/554 (2013.01); B32B 2471/00 (2013.01); B32B 2607/02 (2013.01); E04F 15/107 (2013.01)

(58) Field of Classification Search
CPC ... C09D 175/16; C09D 127/06; E04F 15/105; E04F 15/107; E04F 13/18; B05D 3/06; B32B 3/30; B32B 27/16; B32B 27/308; B32B 27/40; B32B 27/304; B32B 27/22; B32B 27/08; B32B 7/12; B32B 2307/554; B32B 2255/10; B32B 2255/26; B32B 2607/02; B32B 2471/00
See application file for complete search history.

(56) References Cited

U.S. PATENT DOCUMENTS

| 3,929,929 | A  |   | 12/1975 | Kuehn |       |
|-----------|----|---|---------|-------|-------|
| 4,100,318 | A  |   | 7/1978  | McCann et al. | |
| 4,174,307 | A  |   | 11/1979 | Rowe  |       |
| 4,309,526 | A  |   | 1/1982  | Baccei |      |
| 4,312,798 | A  |   | 1/1982  | Kovacs |      |
| 4,393,187 | A  |   | 7/1983  | Boba et al. | |
| 4,598,009 | A  |   | 7/1986  | Christie et al. | |
| 4,607,084 | A  |   | 8/1986  | Morris |      |
| 6,586,108 | B1 |   | 7/2003  | Courtoy et al. | |
| 7,741,395 | B2 |   | 6/2010  | Holt et al. | |
| 2002/0127372 | A1 | * | 9/2002 | Waite ..................... B32B 23/08 428/172 |
| 2003/0108718 | A1 | * | 6/2003 | Simon ..................... B29C 44/06 428/172 |
| 2004/0054075 | A1 | * | 3/2004 | Gloeckner ........... C08G 63/553 524/601 |
| 2007/0066704 | A1 | * | 3/2007 | Schwalm ............ C08F 290/067 522/173 |
| 2008/0286592 | A1 | * | 11/2008 | Smelyansky ............. C08F 2/48 428/481 |
| 2010/0009076 | A1 | * | 1/2010 | Walther .................. C08G 18/10 427/204 |
| 2010/0298477 | A1 | * | 11/2010 | Godwin .................. C08K 5/10 524/285 |

(Continued)

FOREIGN PATENT DOCUMENTS

FR  2 379 323 A1  9/1978
JP  2008000973 A  1/2008

(Continued)

OTHER PUBLICATIONS

Database WPI, Week 200835; Thomson Scientific, London, GB; AN 2008-F12176; XP002729700.

(Continued)

Primary Examiner — Michael Zhang
(74) Attorney, Agent, or Firm — Reinhart Boerner Van Deuren P.C.

(57) ABSTRACT

The present invention is related to decorative surface coverings, in particular floor or wall coverings, exhibiting low volatile organic compounds (VOC) emission, comprising one or more adjacent plasticized polyvinyl chloride layers and a polyurethane top-layer, said top-layer being obtained from radiation curing a 100% solids polyurethane formulation.

17 Claims, No Drawings

(56) References Cited

U.S. PATENT DOCUMENTS

| | | | |
|---|---|---|---|
| 2011/0040001 A1* | 2/2011 | Gosse | C08K 5/0016 |
| | | | 524/285 |
| 2011/0112244 A1* | 5/2011 | Van Holen | C08F 283/006 |
| | | | 524/591 |
| 2013/0216839 A1* | 8/2013 | Jendoubi | B32B 27/08 |
| | | | 428/424.6 |
| 2013/0230729 A1 | 9/2013 | Tian et al. | |

FOREIGN PATENT DOCUMENTS

| | | |
|---|---|---|
| KR | 20010016758 A | 3/2001 |
| WO | WO 2009/067384 A1 | 5/2009 |
| WO | WO 2012/049003 A2 | 4/2012 |

OTHER PUBLICATIONS

Database CA (Online) Chemical Abstracts Service, Columbus, Ohio, US; Kremer, Wolfgang et al: "Water-soluble systems. Two-component and UV polyurethanes with low VOC emissions for wood varnishes", XP002729699.

Database WPI, Week 200162, Thomson Scientific, London, GB; AN 2001-555503; XP002729701.

* cited by examiner

ACTINIC RADIATION CURED POLYURETHANE COATING FOR DECORATIVE SURFACE COVERINGS

FIELD OF THE INVENTION

The present invention is related to polyvinyl chloride based decorative floor and wall coverings comprising a barrier top-layer obtained from curing a 100% solids radiation curable polyurethane compositions. The invention is further related to a method for the production of said surface coverings.

STATE OF THE ART

Polyvinyl chloride flooring products are usually prepared from plastisols. Most plastisols for vinyl flooring products are formulated using polyvinyl chloride (PVC) emulsion resins mixed with primary and secondary plasticizers, extenders, stabilizers and other additives. After being applied to a substrate, for example by spread coating, the layer of plastisol is fused and gelled by heating to an elevated temperature.

Thermoplastic layers made from polyvinyl chloride (PVC) plastisols show various limitations and disadvantages, such as insufficient gloss retention, insufficient wear and abrasion resistance, stain resistance, scuff resistance, and resistance to various chemical agents among others.

A method to remedy these shortcomings consists in the application of a coating, obtained from thermal and/or radiation cure of a liquid composition of monomers and/or polymers, as the outermost surface layer on polyvinyl chloride (PVC) layer. In general these coatings are polyurethane, polyester, polyether, polycarbonate poly(meth)acrylate and/or epoxy based.

U.S. Pat. No. 6,586,108 discloses a flooring material or a wall covering coated with a wear layer that is a heat-cured and radiation-cured coating composition, the composition including a polyvinyl chloride resin, an acrylic or methacrylic compound, and a radiation-reactive urethane oligomer, the composition being substantially or completely free of internal or external plasticizers. The thickness of the cured layer depends on its intended application. For single wear layers for flooring materials the coating thickness most preferable is about 250μ.

FR 2,379,323 discloses a top coat composition that contains, additionally to the usual polyurethane polymers, an ethylenically unsaturated compound. After being applied to a foamable substrate but prior to being thermally cured, the composition is irradiated with U.V. light or an ionizing radiation or is heated to a low temperature by infrared radiation. This causes polymerization of the ethylenically unsaturated compound, which increases the hot melt viscosity of the composition and changes it to a solid state. The partially crosslinked composition creates a high temperature melt flow barrier film that prevents the escape of gases from the foamed underlayer when the latter is fused at a high temperature. The ethylenically unsaturated compounds used for this purpose are all very expensive monomers.

U.S. Pat. No. 4,393,187 discloses a polyurethane coating which is essentially one macromolecule of homogeneous structure wherein the nitrogen atoms of the urethane groups are joined to alicyclic rings and/or straight aliphatic chains and the main polyurethane chains are crosslinked by three types of crosslinkages: 1) via isocyanate residues and triol or tetrol residues, reactive upon curing by exposure to heat; 2) via double bonds in vinyl compounds reactive, upon curing by exposure to radiation, with acrylo groups incorporated as acrylate esters into the polyurethane structures; and 3) via urea groups formed by action of moisture upon isocyanate groups which are unreacted in the heat and radiation curing steps. One particularly suitable substrate is resilient, foamed, embossed polyvinyl chloride yard goods such as used for floor covering.

US 2013/0230729 discloses a coating, comprising a biobased component including urethane acrylate, vinyl ether, or polyester acrylate. The coating composition includes at least about 5% by weight of renewable or biobased content. The coating composition is radiation curable, formed by acrylating a biobased polyol acrylate, and reacting the biobased polyol acrylate with polyisocyanate to form a biobased resin. The floor product includes a substrate such as linoleum and resilient sheet among others.

KR20010016758 (A) discloses a radiation curable coating composition for a PVC floor material being strong against the light of a cigarette, which is excellent in strain-resistance, chemical-resistance, abrasion-resistance, and heat-resistance. The radiation curable coating composition comprises 40 to 60% by weight of radiation curable oligomers comprising urethane acrylate and melamine acrylate, 10 to 15% by weight of reactive monomers having more than two functions, 20 to 35% by weight of a reactive diluent having single function to multi-function, 2 to 5% by weight of a photo initiator, and 1 to 5% by weight of additives containing an antioxidant and a quenching agent.

For embossed decorative surface coverings the coating is in general applied on the PVC layer(s), before or after embossing. When the coating formulation is applied before embossing, curing of the coating may be performed before or after embossing.

U.S. Pat. No. 4,598,009 discloses a method for producing an embossed material which comprises the steps of: (a) applying to a substrate an embossable and crosslinkable coating comprising a linear polyurethane in combination with a photoinitiator that is effective in crosslinking the polyurethane upon exposure to actinic radiation, said linear polyurethane containing unsaturated sites only in the polymeric backbone thereof; (b) embossing the coating to thereby form a desired pattern thereon; and (c) irradiating the embossed coating with actinic radiation to thereby crosslink the polyurethane coating and permanently fix the embossed pattern.

U.S. Pat. No. 4,100,318 discloses a process for producing a cushioned sheet goods product comprising the steps of: A) coating a substrate with a flexible foamable vinyl composition and heating to gel the foamable composition, B) applying a decorative pattern to the surface of the gelled coating, C) coating a clear vinyl overlay over the decorative pattern, and passing through a high temperature oven to fuse the clear vinyl overlay and expand the foam to the required thickness, D) cooling the sheet surface to a temperature which permits bonding with an actinic radiation curable coating, E) applying an actinic radiation curable coating composition which is essentially solvent free and comprises at least one organic compound having at least two photopolymerizable ethylenically unsaturated groups per molecule and capable of curing upon exposure to actinic radiation to form a continuous coating, F) exposing the thus coated sheet to actinic radiation until such coating has set, whereby the stain resistance, scratch and scuff resistance, abrasion resistance and gloss retention properties are enhanced by adding the actinic radiation curable coating.

The actinic radiation cured coating contains polar groups such as urethane, ethers, esters, amides, epoxies and combinations thereof.

JP 2008-000973 discloses a transparent vinyl chloride resin sheet being hot-pressed on the pattern and/or surface of a colored vinyl chloride resin sheet with the patterns and/or surface printed to form the decorative material for building materials. The patterns and/or surface of the colored vinyl chloride resin sheet are formed by using water base inks using an aqueous urethane resin as a binder. In the decorative material, the measured value of volatile organic compounds (VOC) measured by a gas chromatography method is described to be below 3 mg/m². The flooring material using the decorative material is also provided.

Kremer, W. et al in "Water-soluble systems. Two-component and UV polyurethanes with low VOC emissions for wood varnishes.", Pinturas y Acabados Industriales (2000), 42(258), 36-42 describe the development of water-based polyurethanes with focus on new generation water-soluble polyisocyanates and binder dispersions based on polyacrylate and/or polyester-polyurethanes. Fast-drying polyols, e.g., primary dispersions and secondary dispersions (acrylic and vinyl polyesters and polyurethanes) are described. The characteristics of UV curable water-soluble polyurethane systems are outlined, including formulations without solvents that meet VOC emission standards and have good wear resistance but poor drying and require larger amounts of photoinitiator. The UV curable water-soluble polyurethanes are described to be especially useful for wood profiles and trims, staircases, parquet, doors, chairs, door frames, factory-assembled furniture, kitchen cabinets, PVC flooring, leather varnishes, flexographic inks, and over-printing varnishes.

WO 2009/067384 discloses vinyl chloride polymer compositions, optionally plasticized, containing a hydrophilic polymer (e.g., a hydrophilic polyurethane or hydrophilic vinyl polymer) for use as coatings and films with increased moisture vapor transmission and/or static dissipative properties. Films from this material are described to be useful as fluid barriers that allow diffusion of moisture vapors. It is described that similar modifications can be made to acrylate and urethane polymer.

Plasticizers conventionally used for PVC compositions include dialkyl phthalates, for example dioctyl phthalate. These conventional plasticizers have proven unsatisfactory for various reasons, one of which is that they have a tendency to migrate to the surface and exude from the surface.

Recently, the requirements placed upon the plasticizers have become more stringent with respect to performance and non-toxicity to humans and the environment. The use of phthalates is subject to continuously increasing restriction deriving from legal requirements.

There thus is a need either for a phthalate-free replacement of the phthalate ester plasticizers or for means preventing the phthalate ester plasticizers to migrate to and exude from the surface.

Replacing phthalate based plasticizers by phthalate-free plasticizers is already subject to a number of technical publications and patent literature. Yet the products obtained from processing these phthalate-free plastisols do not present a sufficiently reduced volatile organic compound release.

Migration of plasticizers to the surface and exudation from the surface may be reduced by applying a coating on the PVC layer.

WO 2012/049003 discloses the use of a polyvinyl alcohol based layer as a barrier layer on the PVC-based wear layer of a PVC-based surface covering to reduce or to prevent volatile organic compounds (VOC) release. The barrier coating is obtained from heating said wear layer and a coating composition comprising polyvinyl alcohol and a silane compound comprising at least one amine function at a temperature equal or superior to 150° C. during 1 to 3 minutes. When applied at a temperature below 150° C. another heating step at a temperature equal or superior to 150° C. is required to get an improved adhesion between the barrier layer and the PVC-based wear layer. The lack of adhesion may result in moderate to poor barrier properties.

For certain production processes, specific to particular production lines the top-layer, different from the PVC wear layer, is applied at room temperature on embossed or non-embossed PVC based surface coverings. From economical point of view radiation curable coatings are advantageous since curing, mostly performed around room temperature, is almost immediately. Yet adhesion problems between the radiation cured coating and the PVC-layer occur, resulting in a moderate to poor barrier.

Aims of the Invention

The present invention aims to provide decorative floor and wall coverings, in particular those obtained from fusing and gelling phthalate comprising plastisols, substantially free of plasticizer migration and exudation and exhibiting a low volatile organic compound (VOC) release. A further aim of the present invention is to provide a process for the production of such surface coverings.

SUMMARY OF THE INVENTION

The present invention discloses a decorative surface covering, in particular floor or wall covering, exhibiting (i.e. with, having, presenting, or showing) low VOC emission, said surface covering comprising one or more adjacent plasticized polyvinyl chloride layers and a polyurethane top-layer comprising acid functionalities.

Preferred embodiments of the present invention disclose one or more of the following features:

said decorative surface covering is characterized by a total volatile organic compound (TVOC) emission lower than 100 µg·m$^{-3}$, measured after 28 days in accordance with ISO 16000-6, ISO 16000-9 or ISO 16000-10;

said decorative surface covering is characterized in that the sum of the total volatile organic compound emission (TVOC), semi-volatile organic compound emission (SVOC) and formaldehyde emission is lower than 10 µg·m$^{-3}$, measured after 28 days in accordance with ISO 16000-6, ISO 16000-9 or ISO 16000-10;

said decorative surface covering, comprises a mechanical embossed textured and/or patterned structure;

said decorative surface covering is characterized in that one or more polyvinyl chloride layers comprise 100 parts of polyvinyl chloride and 5 to 250 parts of one or more plasticizers;

said decorative surface covering is characterized in that the polyurethane top-layer comprises acid functionalities selected from the group consisting of —SO3H, —OSO3H, —COOH, —OPO3H2 and —OPO2HO—.

said decorative surface covering is characterized in that the polyurethane top-layer is obtained from radiation curing of a radiation curable polyurethane formulation comprising from 50 to 100% by weight preferably from 60 to 90% by weight of ethylenically unsaturated group comprising compounds said compounds comprising:
a) from 5 to 95% by weight preferably from 20 to 80% by weight of at least one radiation curable polyurethane,
b) from 0.1 to 10% by weight preferably from 1 to 8% by weight of at least one acidic adhesion promoter,
c) from 5 to 90% by weight preferable from 20 to 75% by weight of at least one mono- and/or polyfunctional reactive diluent.

the radiation curable polyurethane (a) of the radiation curable polyurethane formulation is an aliphatic polyurethane acrylate.

the acidic adhesion promotor (b) of the radiation curable polyurethane formulation comprises one or more carboxylic acid groups.

the reactive diluent (c) of the radiation curable polyurethane formulation comprises at least two ethylenically unsaturated groups, preferable at least two (meth)acrylate groups.

The present invention further discloses a process for the preparation of said decorative surface covering comprising the steps of:
I. supplying a backing layer;
II. contacting the backing layer with a plastisol composition comprising polyvinyl chloride and one or more plasticizers;
III. fusing and gelling said plastisol composition;
IV. cooling down the fused and gelled plastisol layer;
V. applying a radiation curable polyurethane formulation comprising from 50 to 100% by weight preferably from 60 to 90% by weight of ethylenically unsaturated group comprising compounds said compounds comprising:
a) from 5 to 95% by weight preferably from 20 to 80% by weight of at least one radiation curable polyurethane,
b) from 0.1 to 10% by weight preferably from 1 to 8% by weight of at least one acidic adhesion promoter,
c) from 5 to 90% by weight preferable from 20 to 75% by weight of at least one mono- and/or polyfunctional reactive diluent;
VI. irradiating said radiation curable polyurethane formulation.

Preferred embodiments of the process for the preparation of said decorative surface coverings disclose one or more of the following features:
step (II) comprises more than one adjacent plastisol layer and fusing and gelling in step (III) is performed after application of each separate plastisol layer or after application of all the plastisol layers.
the one or more adjacent plastisol layers are fused and gelled in step (III) at a temperature comprised between 130° C. and 200° C.
mechanical embossing is performed at a surface temperature comprised between 130° C. and 200° C. after fusing and gelling the plastisol composition and before cooling down in step (IV)
cooling down the one or more fused and gelled adjacent plastisol layers in step (IV) to a temperature comprised between 15° C. and 40° C.

DETAILED DESCRIPTION OF THE INVENTION

The object of the present invention is to provide polyvinyl chloride based decorative floor and wall coverings exhibiting (i.e. with, having, presenting, or showing) a reduced VOC release, said VOC release being preferably below 100 $\mu g \cdot m^{-3}$, more preferably below 10 $\mu g \cdot m^{-3}$, measured after 28 days according to ISO 16000-9 or ISO16000-10.

The object of the present invention is to have said reduced VOC release from PVC floor and wall coverings obtained from gelling and fusing of plastisols, in particular plastisols comprising phthalate based plasticizers.

We now have surprisingly found that said reduced VOC release is obtained from decorative floor and wall coverings having a polyurethane top-layer, said polyurethane top-layer being obtained from particular flowable radiation curable polyurethane coating compositions that are 100% solids.

In general, a coating composition having different compositional ingredients than the underlying layer exhibits a moderate to poor adhesion to said underlying layer.

In the present invention, an homogeneous polyurethane top-layer is obtained from (radiation curing of) a 100% solids radiation curable polyurethane composition. In the context of the present invention, a 100% solids refers to the absence of water and/or organic solvents in the composition (or formulation) (i.e. having a solid content of 100%).

In the present invention, said polyurethane top-layer comprises acid functionalities.

We have found that the use of the particular radiation curable polyurethane compositions of the present invention allows for coatings with an outstanding adhesion to embossed and non-embossed PVC-based decorative surface coverings resulting in a very efficient VOC release barrier. The application and curing preferably is carried out at room temperature but can also be done at temperatures higher than room temperature as long as no coating components evaporate from the formulation.

The decorative surface coverings of the present invention comprise one or more PVC layers, obtained from fusing and gelling of plastisols, and a polyurethane layer, obtained from the radiation curing of a 100% solids radiation curable polyurethane composition, atop.

A plastisol is a fluid or a paste consisting of a mixture of polyvinyl chloride and a plasticizer optionally containing various additives. A plastisol is used to produce layers of polyvinyl chloride which are then fused to articles of flexible polyvinyl chloride. Plastisols typically contain 15 to 200 parts of a plasticizer blend per 100 parts of polyvinyl chloride, said blend comprising from 5 to 190 parts of one or more particular primary plasticizers and from 1 to 100 parts of one or more particular secondary plasticizers.

The plastisols of the present invention may comprise one or more phthalate based and/or phthalate-free primary plasticizers and one or more secondary plasticizers.

Phthalate based primary plasticizers for being used in the plastisols of the present invention are phthalic acid esters, preferably selected from the group consisting of di-(2-ethylhexyl) phthalate, diisononyl phthalate, dibutyl phthalate, diisodecyl phthalate, di-n-octyl phthalate and benzyl butyl phthalate.

Phthalate-free primary plasticizes for being used in the plastisols of the present invention are selected from the group consisting of the alkyl esters of cyclohexane dicarboxylic acids, the dialkyl esters of aliphatic dicarboxylic acids and the alkyl esters of aromatic di-, tri-, or tetra-carboxylic acids, with the exception of orthophthalic acid.

Secondary plasticizers for being used in the plastisols of the present invention are preferably selected from the group consisting of the lower alkyl esters of isophthalic and terephthalic acid, benzoates, citrates, phosphates, and sulfonates.

The plastisol of the present invention preferably comprises from 10 to 160 parts, more preferably from 15 to 130 parts, most preferably from 15 to 75 parts of one or more phthalate based and/or phthalate-free primary plasticizers and from 3 to 80 parts, more preferably from 5 to 60 parts, most preferably 10 to 50 parts of one or more secondary plasticizers per 100 parts of polyvinyl chloride.

Polyvinyl chloride used in the plastisols of the present invention is produced by emulsion polymerization or micro-suspension polymerization.

Typical suspension polymerized polyvinyl chloride consists of agglomerated particles of a size in the range of 80 to 200 μm (80 to 200 microns). Polyvinyl chloride of particle size between 1 and 40 μm (1 and 40 microns) may be produced by micro-suspension polymerization.

Typically, the agglomerated particles of emulsion polyvinyl chloride have a particle size in the range of 15 to 20 μm (15 to 20 microns).

Different forms of polyvinyl chloride are used in different applications. One important property is the mean molecular weight of the polymer. A factor known as the "K value" is used to indicate the mean molecular weight of polyvinyl chloride. The K value is the viscosity of a 0.005% by weight solution of the polyvinyl chloride in cyclohexanone at 25° C. as measured using an Ubbelhode viscometer. The K value is the German standard DIN 53726.

The K value of the polyvinyl chloride impacts the fusion temperature and gelation rate of the plasticized polyvinyl chloride composition. Typically the higher the K value the better the mechanical properties but the lower the flowability.

Emulsion and micro-suspension polymerized polyvinyl chloride are preferred for applications where good flow of the plasticized polyvinyl chloride is required such as spread coating, as used in the manufacture of floor or wall covering. For spread coating a K value 65 to 90 is preferred.

The plastisols of the present invention further comprises up to 250 parts of fillers, up to 7 parts of stabilizers, up to 5 parts epoxidized vegetable oils and up to 100 parts of other components selected from the group consisting of viscosity reducers, blowing agents, liquid kickers, antistatic agents, fire retardants, dyes, pigments, lubricants and processing aids.

Illustrative examples of fillers are calcium carbonate, clays, calcium silicate, talc, calcium sulfate, calcium oxide, magnesium oxide, titanium oxide, zinc oxide, aluminosilicates, dolomite, bauxite and silica, diatomaceous earth and molecular sieves.

Examples of stabilizers are benzotriazole and benzophenone compounds to reduce the degradation by sunlight and stabilizers to provide stability during heat processing which are typically metal compounds, particularly lead salts, organotin compounds, barium, cadmium and zinc salts and calcium/zinc stabilisers.

Examples of epoxidized vegetable oils are epoxidized soya bean oil, sunflower oil, linseed oil, corn oil rubber seed oil, neem oil and mee oil. The epoxidized vegetable oils may be mixed into the plastisol composition as plasticizer providing heat and light stability.

Examples of viscosity reducing agents are aliphatic hydrocarbons such as Viscobyk® 4010, 4013, 4015 and 4040, carboxylic acid derivates such as Viscobyk®5025, 5125 and 5050, Jayflex® 615 or Exxsol® D100, dodecyl benzene such as Jayflex® 602, specialty esters based on oleates and laurates, 2,2,4-trimethylpentanediol diisobutyrate, C3 to C17 esters of 1,2,4-trimethyl-1,3-pentanediol, C3 to C17 esters of 1,2,4-trimethyl-1,3-pentanediol monoisobutyrate and mixtures thereof, such as disclosed in U.S. Pat. No. 7,741,395.

Examples of blowing agents include azodicarbonamide, oxybisbenzenesulfonyl-hydrazide, azobisisobutyronitrile, toluenesulfonylhydra-zide, sodium bicarbonate and citric acid which release for example nitrogen and carbon dioxide and water when heated.

Examples of kickers include lead compounds such as dibasic lead phthalate, zinc oxide or barium/cadmium compounds. Kickers control and lower the decomposition temperature of the blowing agent.

Examples of antistatic agents are cationic, non-ionic or anionic in nature and generally are selected from the group consisting of amides and amines, quaternary ammonium compounds, polyalkylene glycol derivatives, sulphates and sulphonates, and miscellaneous ethers and esters.

Typical examples of antistatic agents are lauramidopropyl-trimethylammonium methosulfate, myristamidopropyl-trimethylammonium methosulfate, stearamidopropyl-trimethylammonium methosulfate and stearamidopropyl-dimethyl-beta-hydroxy-ethylammonium dihydrogen phosphate. The antistatic agents reduce build-up of static charges and to promote charge dissipation in their products.

Examples of fire retardants that can be used in the phthalate-free plastisol compositions of the present invention include halogen containing compounds and phosphorous containing organic compounds such as triaryl, trialkyl or alkyl diaryl phosphate esters. Other materials that may be used include chloroparaffins, aluminum trihydrate or antimony oxides.

The fire retardants are admixed to the compositions of the present invention in order to increase ignition time, reduce flame spreading and rate of burning.

A variety of dyes and pigments can be utilised in the plastisol compositions of the invention. Examples of useful pigments and dyes are: metallic oxides such as iron oxide, metal hydroxides, metal powders, sulphides, sulphates, carbonates, silicates such as ammoniumsilicate, carbon black, china clay, barytes, iron blues, lead blues, organic reds, organic maroons (and the like).

Examples of lubricants and processing aids that can be used in the phthalate-free plastisol compositions of the present invention include stearic acid, metal stearates, petroleum waxes, silicon oil, mineral oil, synthetic oils and polyethylene waxes.

The plastisol compositions of the present invention are prepared using any convenient method known to the one skilled in the art. In general the finely divided PVC polymer and optionally other finely divided solid materials are dispersed in the liquid plasticizer blend forming a paste. On heating the dispersion to a temperature above 100° C., the polymer becomes soluble in the plasticizer whereupon the two phase dispersion is transformed into a single phase system.

Typically PVC plastisols are produced in batch processes using high shear mixing equipment. The mixing generally is performed for a period of from (about) 15 to (about) 60 minutes, whereupon the blend is cooled down. In general such process is used for making plastisols which are immediately further processed, since the high friction level of the mixing elements in the plastisol results in high local temperature increase which generally results in poor viscosity stability of the plastisol on storage.

On the other hand, storage stable plastisols can be prepared by blending the finely divided PVC polymer, optionally other finely divided solid materials, liquid plasticizer blend and optionally other liquid materials in a blending tank with low shear. The pre-homogenized plastisol is recirculated from the blending tank through a dynamic mixer back into the blending tank. This recirculation is performed up to 10 times prior to discharging the final plastisol.

The radiation curable polyurethane formulation for being used in the present invention in general is composed of:
a) at least one radiation-curable polyurethane
b) at least one acidic adhesion promoter,
c) at least one mono- and/or polyfunctional reactive diluent The preparation of radiation-curable polyurethane resins is described for example in U.S. Pat. Nos. 3,929,929; 4,174,307; 4,309,526; 4,312,798 and 4,607,084.

The radiation-curable polyurethanes (a) used in accordance with the invention have a number average molecular weight is between 500 and 25 000 g·mol$^{-1}$, preferably between 1000 and 20000 g·mol$^{-1}$, more preferably between 1500 and 15000 g·mol$^{-1}$.

Radiation curable polyurethanes are prepared from hydroxyl-containing monomers and/or polymers and compounds which at one and the same time contains at least one isocyanate-reactive group (e.g., alcohol, amine or thiol) and at least one polymerizable acrylate group, by reaction with polyisocyanates. They contain both urethane groups and acrylate groups.

Suitable hydroxyl containing monomers are chosen from the group consisting of methanol, ethanol, 1-propanol, 1-butanol, 1-pentanol, 1-hexanol, 2-propanol, 2-butanol, 2-ethylhexanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, 2,2-dimethylolpropionic acid, 2,2-dimethylolbutanoic acid, hydrogenated bisphenol A (2,2-bis (4-hydroxycyclohexyl)propane), diols derived from dimer fatty acids, 2,2-dimethyl-3-hydroxypropionic acid (2,2-dimethyl-3-hydroxypropyl ester), glycerol, trimethylolethane, trimethylolpropane, trimethylolbutane and/or castor oil. Neopentyl glycol, 1,4-butanediol, 1,4-cyclohexanedimethanol, 1,6-hexanediol and/or trimethylolpropane are preferred.

Suitable hydroxyl-containing polymers include, in particular, polyesters, polyethers, polyether-esters, polycarbonates, polyether carbonate polyols and polycarbonate polyesters having a functionality of from 1.0 to 3.0, in each case with a weight average molecular weight in the range of from 300 to 4,000, preferably 500 to 2,500 g·mol$^{-1}$. Hydroxyl functional polyesters and polyetherdiols are particularly preferred.

The polyether diols useful in this invention are dihydroxy terminated polyalkylene oxides having 2 to 4 carbon atoms in each alkylene group. Such polyether diols are made by polymerizing ethylene oxide, propylene oxide, or butylene oxide, or mixtures thereof to form block copolymers, with a dihydric initiator. Such initiators are ethylene glycol, diethylene glycol, 1,2-propylene glycol, 1,4-butanediol (and the like). A preferred polyether diol is made by polymerizing tetrahydrofuran to a polyether diol having 4 carbon atoms in each alkylene group. Useful polyether diols have molecular weights of (about) 800 to (about) 2000. A most preferred polyether diol has a molecular weight of (about) 1000.

Hydroxyl-containing polyesters are prepared by polycondensation of suitable dicarboxylic acids and diols. The condensation takes place conventionally in an inert gas atmosphere at temperatures from 180 to 260° C., preferably 200 to 230° C., in the melt, or in azeotropic mode.

The carboxylic acids that are preferred for polyester preparation may be aliphatic, cycloaliphatic, aromatic and/or heterocyclic in nature and may if desired be substituted by halogen atoms and/or unsaturated. Examples thereof include the following: succinic, adipic, suberic, azelaic, sebacic, phthalic, terephthalic, isophthalic, trimellitic, pyromellitic, tetrahydrophthalic, hexahydrophthalic, hexahydroterephthalic, dichlorophthalic and tetrachlorophthalic, endomethylene tetrahydrophthalic, and glutaric acid, 1,4-cyclohexanedicarboxylic acid, and—where obtainable—their anhydrides or esters. Especially suitable are adipic acid and 1,4-cyclohexanedicarboxylic acid.

Examples of suitable polyols include monoethylene glycol, 1,2- and 1,3-propylene glycol, 1,4- and 2,3-butylene glycol, di-beta-hydroxyethylbutanediol, 1,5-pentanediol, 1,6-hexanediol, 1,8-octanediol, decanediol, dodecanediol, neopentyl glycol, cyclohexanediol, bis(hydroxymethyl)tricyclo(5.2.1.0(2,6))decane (Dicidol), 1,4-bis(hydroxymethyl)cyclohexane, 2,2-bis-(4-hydroxycyclohexyl)propane, 2,2-bis[4-(beta-hydroxy-ethoxy)phenyl]propane, 2-methylpropane-1,3-diol, 2-methyl-pentane-1,5-diol, 2,2,4(2,4,4)-trimethyl-hexane-1,6-diol, glycerol, trimethylolpropane, trimethylolethane, hexane-1,2,6-triol, butane-1,2,4-triol, tris (.beta.-hydroxyethyl)isocyanurate, pentaerythritol, mannitol, and sorbitol, and also diethylene glycol, triethylene glycol, tetraethylene glycol, dipropylene glycol, polypropylene glycols, polybutylene glycols, xylylene glycol, and neopentyl glycol hydroxypivalate. Preference is given to monoethylene glycol, neopentyl glycol, Dicidol, cyclohexanedimethanol, trimethylolpropane, and glycerol.

Polyesters prepared in this way have an OH number of 15 to 750 mg KOH/g. Mixtures of polyesters can be used as well.

For preparing urethane acrylates the polyisocyanates used are diisocyanates of (cyclo)aliphatic or aromatic structure. Representative examples of (cyclo)aliphatic polyisocyanates are 2-methylpentamethylene 1,5-diisocyanate (MPDI), hexamethylene diisocyanate (HDI), trimethylhexamethylene 1,6-diisocyanate (TMDI), in particular 2,2,4- and the 2,4,4 isomer and technical mixtures of both isomers, 4,4'-methylenebis(cyclohexyl isocyanate) (H$_{12}$MDI), norbornane diisocyanate (NBDI), and 3,3,5-trimethyl-1-isocyanato-3-isocyanatomethyl-cyclohexane (IPDI). Likewise highly suitable as well are polyisocyanates which are obtainable by reacting polyisocyanates with themselves via isocyanate groups, such as isocyanurates, which come about through reaction of three isocyanate groups. The polyisocyanates may likewise contain biuret groups or allophanate groups. IPDI and/or IPDI trimer is especially suitable.

Examples of aromatic polyisocyanates are 1,4-diisocyanatobenzene (BDI), 2,4-diisocyanatotoluene (2,4-TDI), 2,6-diisocyanatotoluene (2,6-TDI), 1,1'-methylenebis[4-isocyanatobenzene] (MDI), xylylene diisocyanate (XDI), tetramethylxylylene diisocyanate (TMXDI), 1,5-naphtalene diisocyanate (NDI), tolidine diisocyanate (TODI) and p-phenylene diisocyanate (PPDI). Preference is given to (cyclo)aliphatic polyurethanes.

Examples of suitable polymerizable compounds having at least one free OH group and a polymerizable (meth)acrylate group include the esterification products of aliphatic and/or aromatic polyols with (meth)acrylic acid having a residual average hydroxyl functionality of (about) 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction.

Examples of suitable lactones are gamma-butyrolactone and, in particular delta-valerolactone and epsilon-caprolactone. These modified or unmodified polyols are partly esterified with acrylic acid, methacrylic acid or mixtures thereof until the desired residual hydroxyl functionality is reached.

Particularly preferred are compounds comprising at least two (meth)acryl functions such as glycerol diacrylate, trimethylolpropane diacrylate, glycerol diacrylate, pentaerythritol triacrylate, ditrimethylolpropane triacrylate, dipentaerythritol pentaacrylate and their (poly)ethoxylated and/or (poly)propoxylated equivalents.

Other suitable compounds are the (meth)acrylic esters with linear and branched polyols in which at least one hydroxy functionality remains free, like hydroxyalkyl(meth) acrylates having 1 to 20 carbon atoms in the alkyl group. Preferred molecules in this category are hydroxyethyl (meth)acrylate, hydroxypropyl (meth)acrylate, hydroxybutyl (meth)acrylate.

Hydroxyl functional polyester (meth)acrylates, polyether (meth)acrylates, polyether-ester (meth)acrylates, polycarbonate (meth)acrylates and polyether carbonate (meth)acrylates, comprising at least one hydroxyl functionality, can be used as well.

To prepare the urethane acrylate from the OH-containing monomers and/or polymers, polyisocyanates, and the acrylate component, first of all the polyisocyanate is introduced, a suitable catalyst (e.g., DBTL) and a polymerization inhibitor (e.g., IONOL CP, Shell) are added, and the acrylate component, hydroxyethyl acrylate for example, is added in an NCO:OH ratio of 2.5 to 1:1. Thereafter the OH-containing monomers and/or polymers, preferably the polyester is added to the reaction product, in a residual NCO:OH ratio of 0.5 to 0.95:1, and the reaction is completed at 40 to 120° C., so that an NCO content below 0.1% is obtained.

The acidic adhesion promoter (b), used in accordance with the invention, generally comprises one or more acid functionality and one or more (meth)acrylic functionality. The one or more acid functionality is selected from the group consisting of —SO3H, —OSO3H, —COOH, —OPO3H2 and —OPO2HO—. Optionally the acidic hydrogen is substituted by an alkali metal or an ammonium base.

The acidic adhesion promotor is the reaction product of said one or more acid functionality comprising components with one or more functionalized (meth)acrylates.

Examples are ethylenically unsaturated polyesters and polyurethanes comprising one or more —SO3H, —OSO3H, —COOH, —OPO3H2 and —OPO2HO— functionality. Polyesters comprising one or more of said acid functionalities are prepared from one or more polyol components and one or more polybasic acid components, wherein at least one or more diol component and/or one or more dibasic acid component contain one or more —SO3H, —OSO3H, —COOH, and —OPO3H2 functionality.

Examples of —SO3H, —OSO3H, —COOH, and —OPO3H2 functionality comprising polybasic acid or polyol include 5-sulfoisophthalic acid, 2-sulfoisophthalic acid, 4-sulfophthalic acid, 3-sulfophthalic acid, a dialkyl 5-sulfoisophthalate, a dialkyl 2-sulfophthalate, an alkyl 4-sulfophthalic acid, an alkyl 3-sulfophthalic acid, and a sodium or potassium salt of these compounds; and dimethylolpropionic acid. Optionally the sodium sodium, potassium or ammonium salt can be used.

Polyesters comprising one or more phosphate groups in the polyester chain are prepared from condensation of one or more polyols and one or more polybasic acids in the presence of phosphoric acid.

The ethylenically unsaturated polyurethane resin having one or more acid functionality, for use in the present invention, is synthesized from reaction of a polyisocyanate compound, a polyol component having one or more acid functionality, e.g. a polyester polyol having one or more acidic functionality and/or dimethylolpropionic acid, and a compound having one hydroxyl functionality and at least one ethylenically unsaturated double bond such as for example 2-hydroxyethylecrylate.

Hydroxyl functional polyesters having one or more acid functionality are converted into ethylenically unsaturated polyesters having one or more acid functionality through reaction with (meth)acrylic acid.

Acid functional polyesters having one or more —SO3H, —OSO3H, —COOH, —OPO3H2 and —OPO2HO— functionality are converted into ethylenically unsaturated polyesters having one or more of said acid functionalities through reaction with glycidyl(meth)acrylate or hydroxyethyl(meth)acrylate.

Other examples of acidic adhesion promoter, used in accordance with the invention, is the reaction product of hydroxyethylacrylate and phosphorpentoxide forming 2-acryloylethylphosphate, the reaction product of 2-hydroxyethylacrylate and succinic anhydride, the reaction product of a polyester oligomer comprising hydroxyl and carboxyl functionalities with acrylic acid or the reaction product of a carboxyl functionalized polyester oligomer with hydroxyethyl(meth)acrylate.

The acidic adhesion promotor (b), used in accordance with the invention, preferably has a molecular weight of less than 10000 g·mol$^{-1}$, more preferably of less than 7500 g·mol$^{-1}$ or less and most preferably of less than 5000 g·mol$^{-1}$.

Reactive diluents (c) used in accordance with the invention, are for example the alcohols methanol, ethanol, 1-propanol, 1-butanol, 1-pentanol, 1-hexanol, 2-propanol, 2-butanol, 2-ethylhexanol, dihydrodicyclopentadienol, tetrahydrofurfuryl alcohol, 3,3,5-trimethylhexanol, octanol, decanol, dodecanol, ethylene glycol, diethylene glycol, triethylene glycol, tetraethylene glycol, dipropylene glycol, tripropylene glycol, 1,2-propanediol, 1,3-propanediol, 1,4-butanediol, neopentyl glycol, 2-ethyl-2-butylpropanediol, trimethylpentanediol, 1,3-butylene glycol, 1,4-cyclohexanedimethanol, 1,6-hexanediol, 1,2- and 1,4-cyclohexanediol, hydrogenated bisphenol A (2,2-bis(4-hydroxycyclohexyl)propane), glycerol, trimethylolethane, trimethylolpropane, trimethylolbutane, pentaerythritol, ditrimethylolpropane, dipentaerythritol, sorbitol esterified completely with (meth)acrylic acid, and the ethoxylated and/or propoxylated derivatives of said alcohols esterified completely with (meth)acrylic acid and the technical grade mixtures obtained during (meth)acrylation of the abovementioned compounds.

Further suitable reactive diluents are for example epoxy (meth)acrylates, polyether (meth)acrylates, polyester (meth) acrylates and polycarbonate (meth)acrylates having a number average molecular weight preferable comprised between 500 and 10000 g·mol$^{-1}$.

Particularly preferred are reactive diluents comprising more than one ethylenically unsaturated group.

Photoinitiators that can be used in accordance with the invention, can be substantially any photoinitiator. The usual photoinitiators are the type that generate free radicals when exposed to radiation energy. Suitable photoinitiators include, for example, aromatic ketone compounds, such as benzophenones, alkylbenzophenones, Michler's ketone, anthrone halogenated benzophenones.

Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene 9,10-dichloroanthracene; 4,4-dichlorobenzophenone; thioxanthone; isopropylthioxanthone; methylthioxanthone; alpha,alpha,alpha-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; maleimides and their derivatives; and mixtures thereof.

There are several suitable photoinitiators commercially available from Ciba including Irgacure® 184 (1-hydroxy-cyclohexyl-phenyl-ketone), Irgacure® 819 (bis(2,4,6-trimethylbenzoyl)-phenylphosphineoxide), Irgacure® 1850 (a 50/50 mixture of bis(2,6-dimethoxybenzoyl)-2,4,4-trimethylpentyl-phosphine oxide and 1-hydroxy-cyclohexyl-phenyl-ketone), Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure® 907 (2-methyl-1 [4-(methylthio)phenyl]-2-morpholonopropan-1-one), Darocur® MBF (a phenyl glyoxylic acid methyl ester), Irgacure® 2020 Photoinitiator blend (20% by weight of phenylbis(2,3,6-trimethyl benzoyl)phosphine oxide and 80% by weight of 2-hydroxy-2-methyl-1-phenyl-1-propanone) and Darocur® 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators.

Photoactivators can be used in combination with the aforementioned photoinitiators. Photoactivators are well known in the art and are for example chosen from methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

As is known in the art, additional additives can be used. Such additives include dispersing agents, flow aid agents, thickening agents, defoaming agents, deaerating agents, pigments, fillers, flattening agents, matting agents and wetting agents.

The radiation curable coating composition according to the present invention comprises:
i) 50 to 100% by weight preferably 60 to 90% by weight of a radiation curable formulation, said radiation curable formulation comprising:
  from 5 to 95% by weight preferably from 20 to 80% by weight of at least one radiation curable polyurethane (a),
  from 0.1 to 10% by weight preferably from 1 to 8% by weight of at least one acidic adhesion promotor (b) and
  from 5 to 90% by weight preferable from 20 to 75% by weight of at least one mono- and/or polyfunctional reactive diluent (c).
ii) 0 to 15% by weight preferably from 2 to 10% by weight of at least one photoinitiator optionally combined with at least one photoactivator.
iii) 0 to 35% by weight, preferably from 5 to 30% by weight of additional additifs.

The present invention provides a decorative surface covering, more particularly floor and wall covering, comprising a plasticized polyvinyl chloride layer and a polyurethane top-layer.

In a further preferred embodiment, the present invention provides a decorative surface covering comprising one or more adjacent plasticized polyvinyl chloride layer(s) and a polyurethane top-layer. For a multilayer system these polyvinyl chloride layers typically include a foam layer, a decorative layer and a clear protective wear layer.

In yet a further embodiment the present invention provides a method for the preparation of a decorative surface covering comprising spreading out at least one plastisol layer on a backing layer and gelling said PVC plastisol layer at a temperature comprised between 130° C. and 200° C. Hereto, the at least one plastisol is spread on a backing layer moving at around 15 to 25 meters per minute.

For multilayer decorative surface coverings the PVC plastisol is spread on the backing layer in several layers so that the floor covering is literally built up.

The multilayer product is first gelled by contact with one or more heated roll(s) and then passed into an oven where they are gelled and fused at a temperature of from 130° C. to 200° C.

Often the gelling is performed after the spreading of each individual layer starting with the base layer. After the gelling the next layer can be spread.

After gelation of the decorative layer a design may be printed before the application of the protective wear layer.

The protective wear layer in general comprises a PVC layer obtained from gelation/fusion of a PVC plastisol.

When all layers have been spread, and gelled at a temperature comprised between 130° C. and 200° C., the product is passed into an oven to obtain full fusion of all layers together and adequate expansion of the foamed layers.

After gelling and fusing the at least one PVC plastisol composition, the PVC (multi)layer, standing at a temperature comprised between 130 and 200° C., optionally is mechanically embossed.

Mechanical embossing is performed by pressing a texture into the plasticized polyvinyl chloride layer comprising the ethylenically unsaturated polyurethane layer atop. Embossing is carried out at a pressure comprised between 10 and 25 kg·cm$^{-3}$ and surface temperature comprised between 130° C. and 200° C.

The apparatus for mechanically embossing a substrate in general includes a cooled embossing roller and a backup roller operatively positioned within the embossing roller such that a nip is formed between the backup roller and the embossing roller whereby the substrate may pass through the nip and engage the embossing roller for imparting a mechanically embossed pattern. The apparatus further includes a profilometer capable of quantifying the mechanically embossed pattern as the substrate is being embossed.

In general the texture obtained from mechanical embossing is characterized by a depth comprised between (about) 10 to 100 µm, a width comprised between (about) 125 to 400

μm, a wall angle (angle relative to surface) comprised between (about) 5 to 40 degrees and a frequency of (about) 4 to 20 features per cm.

After mechanical embossing the PVC (multi)layer is cooled down in order to homogeneously apply and cure the 100% solids radiation curable polyurethane formulation. The application and curing preferably is carried out at room temperature but can also be done at temperatures higher than room temperature as long as no coating components evaporate from the formulation.

The 100% solids radiation curable polyurethane formulation is applied at a film thickness in general comprised between 3 and 30 μm (3 and 30 microns), preferable between 8 and 20 μm (8 and 20 microns).

The radiation curable compositions of the present invention may be applied onto the PVC under-layer by any suitable coating process known to those of ordinary skill in the art, for example by direct gravure coating, reverse gravure coating, offset gravure coating, smooth roll coating, curtain coating, air-knife coating, spray coating and combinations thereof. The air-knife coating process is preferred.

After application the polyurethane formulation is subjected to actinic radiation such as ultraviolet (UV) radiation with a wavelength of for instance 250-600 nm, whereupon crosslinking is completed.

Examples of radiation sources are medium and high-pressure mercury vapour lamps, lasers, pulsed lamps (flash-light), halogen lamps and excimer emitters.

Preferably, within the context of the present invention, one or more medium pressure mercury vapour UV radiators of at least 80 to 250 W/linear cm are used. Preferably said medium pressure mercury vapour UV radiator(s) is (are) positioned at a distance of from (about) 5 to 20 cm from the substrate. The irradiating time period preferably is comprised between 1 and 60 seconds for having a radiation dose in the range of from 80 to 3000 mJ/cm².

On the other hand the ethylenically unsaturated polyurethane layer can be cured by bombardment with high-energy electron beams (EB) at for instance 150-300 keV. For this particular case, the coating formulations do not comprise photoinitiators. From economical point of view electron-beam curing yet is less attractive as the equipment is quite expensive.

The decorative surface covering, obtained by the method of the present invention, is characterized by an outstanding (or improved) wear and stain resistance and a significantly reduced VOC release (when compared to decorative surface coverings obtained by methods described in the art).

Examples

The following illustrative examples are merely meant to exemplify the present invention but are not destined to limit or otherwise define the scope of the present invention.

A phthalate based and a phthalate-free PVC plastisol formulation, according to the formulations as given in table 1, were prepared by applying the procedure as described in paragraphs 54 to 56.

TABLE 1

| | Component | Plastisol I | Plastisol (II) |
|---|---|---|---|
| PVC | Paste PVC micro-suspension | 100.00 | 70.00 |
| | Paste PVC resin extender | | 30.00 |

TABLE 1-continued

| | Component | Plastisol I | Plastisol (II) |
|---|---|---|---|
| Primary plasticizer | Diisononyl phthalate | 53.00 | |
| | Diisononyl cyclohexanoate | | 16.00 |
| Secondarry plasticizer | Isononyl benzoate | 11.00 | 7.00 |
| Diluant | Texanol isobutyrate | 9.00 | |
| | Branched paraffin | | 5.00 |
| Filler | Calcium carbonate | 160.00 | |
| Stabilizers | Liquid Ca/Zn | | 2.00 |
| | Epoxydized soya bean oil | | 2.50 |
| Other component | Air release | | 0.60 |
| | Blowing agent | 2.90 | |
| | Kicker | 1.70 | |

In table 1:
for Plastisol (I): the PVC resin micro-suspension is a blend of 59 parts of Vestolit ® P1357 K from Vestolit and 41 parts of Lacovyl ® PB 1156 from Arkema; diisononyl phthalate is Vestinol ® 9 from Evonik; isononyl benzoate is Vestinol ® INB from Evonik; Texanol isobutyrate is 2,2,4-trimethyl-1,3-pentanediol diisobutyrate from Eastman Chemical; calcium carbonate is Mikhart ® 40 from Provençale; the blowing agent, azodicarbonamide, is Unifoam ® Ultra 1035 from Hebron and the Kicker, zinc oxide, is Harzsiegel ® 1001 from Norzinco.
for Plastisol (II): the PVC resin micro-suspension is a blend of 60.00 parts of Lacovyl ® PB 1704 H and 10 parts of Lacovyl ® PB 1202 from Arkema; the paste PVC resin extender is Vinnolit ® EXT from Vinnolit; diisononyl cyclohexane is Hexamoll ® DINCH from BASF; isononyl benzoate is Vestinol ® INB from Evonik; the branched paraffin, including normal alkanes, isoalkanes and cyclics, is EXXSOM ™ D100 from Exxon Mobil; liquid Ca/Zn stabilizer is Lankromark ® LZC 393 from Akcros; epoxidized soya bean oil is Drapex ® HSE from Galata Chemicals and air release additive is Byk ® 3160 from Byk Chemie.

The polyvinyl chloride layers obtained after gelling/fusing at a temperature of 170° C. for a period of 30 seconds, at a thickness of (about) 200 micrometer are characterized by a TVOC emission after 28 days of more than 100 μg·m⁻³.

VOC release measurement are performed according to ISO 16000, ISO 16000-6, ISO 16000-9 or ISO 16000-10.

Subsequently an ethylenically unsaturated polyurethane formulation, answering the composition as given in table 2, is applied on the polyvinyl chloride layer, obtained from plastisol (I) and plastisol (II).

The coating is applied by an air knife coating process under conditions to have a coating thickness comprised between 10 and 12 μm.

TABLE 2

| | Coating Formulation | % by weight |
|---|---|---|
| Polyurethane | Desmolux U 100 | 26.11 |
| Reactive diluent | HDDA | 28.74 |
| | OTA 480 | 13.09 |
| Acidic adhesion promotor | Ebecryl 770 | 1.06 |
| Photoinitiator | Esacure KIP 100 F | 3.50 |
| | Additol BP | 2.59 |
| | Ebecryl P 116 | 1.76 |
| Additional additifs | Disperbyk 185 | 1.85 |
| | Syloid Rad 2005 | 6.09 |
| | Deuteron MK | 2.20 |
| | Orgasol 2002 DNAT 1 | 10.00 |
| | Alodur F 800 | 3.00 |

In table 2: the ultra-violet curable polyurethane is Desmolux ® U 10, an aliphatic urethane acrylate, from Bayer; HDDA is hexandioliacrylate and OTA 480 is a triacrylated reactive diluent on a glycerol derivative, both from Allnex; Ebecryl ™ 770 is a carboxylated polyester acrylate oligomer diluted with 40% of hydroxyethylmethacrylate monomer from Allnex; Esacure KIP 100 F is Mixture of oligo [2-hydroxy-2-methyl-1-[4-(1-methylvinyl) phenyl] propanone] and 2-hydroxy-2-methyl-1-phenyl propan-1-one from Lamberti; Additol ® BP is benzophenone from Allnex; Ebecryl ™ is a amine based photoactivator from Allnex; Disperbyk ® 185 is a wetting and dispersing additive from Byk Chemie; Syloid ® Rad 2005 is a matting agent from Grace; Deuteron ® MK is a matting agent from Deuteron; Orgasol ® 2002 DNAT 1 is a spheroïdal powder of polyamide 12 used as reinforcing and matting agent from Arkema; Alodur ® F 800 is aluminum oxide from Imerys.

The coating formulation of table 2 is applied on the PVC layer obtained from fusing and gelling Plastisol (I) and Plastisol (II). The radiation curable polyurethane formulation is applied on the respective PVC layers, standing at (about) 25° C., by an air-knife coating process.

The PVC layer, comprising the uncured ethylenically unsaturated polyurethane formulation, standing at a temperature of (about) 25° C. subsequently is subjected for 6 seconds to irradiation with ultraviolet light emitted by a 160 W/cm medium pressure mercury vapour UV-bulb (Fusion UV Systems Ltd) with a total UV dose of 1500 mJ/cm².

The decorative surface coverings of the present invention, comprising the crosslinked polyurethane top-layer, all are characterized by a TVOC, SVOC and formaldehyde emission after 28 days of less than 10 µg·m⁻³.

The decorative surface coatings of the present invention furthermore prove an outstanding wear resistance, examined by a Taber' abrasion resistance test with CS-17 abrasive wheels under a load of 1 kg according to JIS K 7204 (good after 15000 revolutions) and stain resistance, examined according to EN 423 (not affected to very slightly affected depending on the chemical substance used).

The invention claimed is:

1. Decorative surface covering exhibiting low volatile organic compound (VOC) emission, said surface covering comprising one or more adjacent plasticized polyvinyl chloride layers and a polyurethane top-layer comprising acid functionalities, the polyurethane top-layer being obtained from a 100% solids radiation curable polyurethane composition, wherein the decorative surface covering has a total volatile organic compound (TVOC) emission lower than 100 µg·m−3, measured after 28 days in accordance with ISO 16000-6, ISO 16000-9 or ISO 16000-10.

2. Decorative surface covering according to claim 1 wherein the sum of the total volatile organic compound emission (TVOC), the semi-volatile organic compound emission (SVOC) and the formaldehyde emission is lower than 10 µg·m−3, measured after 28 days in accordance with ISO 16000-6, ISO 16000-9 or ISO 16000-10.

3. Decorative surface covering according to claim 1, comprising a mechanical embossed textured and/or patterned structure.

4. Decorative surface covering of claim 3, wherein the mechanical embossed textured and/or patterned structure has a depth between 0 to 100 µm, a width between 125 to 400 µm, a wall angle between 5 to 40 degrees and a frequency of 4 to 20 features per cm.

5. Decorative surface covering according to claim 1, wherein one or more polyvinyl chloride layers comprise 100 parts of polyvinyl chloride and 5 to 250 parts of one or more plasticizers.

6. Decorative surface covering according to claim 1, wherein the polyurethane top-layer comprises acid functionalities selected from the group consisting of —SO₃H, —OSO₃H, —COOH, —OPO₃H₂ and —OPO₂HO—.

7. Decorative surface covering according to claim 1, wherein the polyurethane top-layer is obtained from radiation curing of a radiation curable polyurethane formulation comprising from 50 to 100% by weight of ethylenically unsaturated group comprising compounds said compounds comprising:
   a) from 5 to 95% by weight of at least one radiation curable polyurethane,
   b) from 0.1 to 10% by weight of at least one acidic adhesion promoter,
   c) from 5 to 90% by weight of at least one mono- and/or polyfunctional reactive diluent.

8. Decorative surface covering according to claim 7 wherein the radiation curable polyurethane (a) of the radiation curable polyurethane formulation is an aliphatic polyurethane acrylate.

9. Decorative surface covering according to claim 7 wherein the acidic adhesion promotor (b) of the radiation curable polyurethane formulation comprises one or more carboxylic acid groups.

10. Decorative surface covering according to claim 7 wherein the reactive diluent (c) of the radiation curable polyurethane formulation comprises at least two ethylenically unsaturated groups.

11. Decorative surface covering according to claim 1, wherein the polyurethane top-layer prevents plasticizer migration and exudation.

12. Decorative surface covering exhibiting low volatile organic compound (VOC) emission, comprising a mechanical embossed textured and/or patterned structure, said surface covering further comprising one or more adjacent plasticized polyvinyl chloride layers and a polyurethane top-layer comprising acid functionalities, the polyurethane top-layer being obtained from a 100% solids radiation curable polyurethane composition, wherein the polyurethane top-layer prevents plasticizer migration and exudation and wherein the decorative surface covering has a total volatile organic compound (TVOC) emission lower than 100 µg·m−3, measured after 28 days in accordance with ISO 16000-6, ISO 16000-9 or ISO 16000-10.

13. Process for the preparation of the decorative surface covering according to claim 1, comprising the steps of:
   I. supplying a backing layer;
   II. contacting the backing layer with a plastisol composition comprising polyvinyl chloride and one or more plasticizers;
   III. fusing and gelling said plastisol composition;
   IV. cooling down the fused and gelled plastisol layer:
   V. applying the 100% solids radiation curable polyurethane composition, comprising from 50 to 100% by weight of ethylenically unsaturated group comprising compounds said compounds comprising:
      a) from 5 to 95% by weight of at least one radiation curable polyurethane,
      b) from 0.1 to 10% by weight of at least one acidic adhesion promoter,
      c) from 5 to 90% by weight of at least one mono- and/or polyfunctional reactive diluent,
   VI. irradiating said radiation curable polyurethane formulation.

14. The process according to claim 13, wherein step (II) comprises more than one adjacent plastisol layer and wherein fusing and gelling in step (III) is performed after application of each separate plastisol layer or after application of all the plastisol layers.

15. The process according to claim 13, comprising fusing and gelling the one or more adjacent plastisol layers in step (III) at a temperature between 130° C. and 200° C.

16. The process according to claim 13 comprising the additional step of embossing the fused and gelled plastisol layer before cooling down in step (IV).

17. The process according to claim 13, comprising cooling down the one or more fused and gelled adjacent plastisol layers in step (IV) to a temperature comprised between 15° C. and 40° C.

* * * * *